(12) United States Patent
Suzuki et al.

(10) Patent No.: US 12,742,498 B2
(45) Date of Patent: Sep. 22, 2026

(54) DRIVE DEVICE THAT CAN EFFECTIVELY COOL TWO ELECTRIC MOTORS

(71) Applicant: TOYOTA JIDOSHA KABUSHIKI KAISHA, Toyota (JP)

(72) Inventors: Yusuke Suzuki, Nisshin (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 18/642,250

(22) Filed: Apr. 22, 2024

(65) Prior Publication Data

US 2024/0401694 A1 Dec. 5, 2024

(30) Foreign Application Priority Data

May 31, 2023 (JP) ................................ 2023-089655

(51) Int. Cl.

| | |
|---|---|
| ***F16H 57/04*** | (2010.01) |
| ***B60K 7/00*** | (2006.01) |
| ***B60K 17/04*** | (2006.01) |
| ***H02K 9/193*** | (2006.01) |

(52) U.S. Cl.

CPC ....... *F16H 57/0476* (2013.01); *B60K 7/0007* (2013.01); *B60K 17/043* (2013.01); *F16H 57/0435* (2013.01); *F16H 57/0436* (2013.01); *H02K 9/193* (2013.01); *B60K 2007/0076* (2013.01)

(58) Field of Classification Search

CPC ............ F16H 57/0476; F16H 57/0435; F16H 57/0436; B60K 7/0007; B60K 17/043; B60K 2007/0076; H02K 9/193

See application file for complete search history.

(56) References Cited

U.S. PATENT DOCUMENTS

| | | | | |
|---|---|---|---|---|
| 11,274,740 | B2 * | 3/2022 | Wilson | F16H 57/0447 |
| 11,279,218 | B2 * | 3/2022 | Hibino | B60K 1/00 |
| 2006/0223670 | A1 * | 10/2006 | Nishikawa | B60K 6/44 123/196 R |
| 2017/0088113 | A1 * | 3/2017 | Morita | F02D 41/12 |

FOREIGN PATENT DOCUMENTS

| | | |
|---|---|---|
| JP | 2008-283836 A | 11/2008 |
| JP | 2011-114946 A | 6/2011 |

* cited by examiner

*Primary Examiner* — Edwin A Young
(74) *Attorney, Agent, or Firm* — Oliff PLC

(57) ABSTRACT

A drive device includes: a first electric motor that drives a left wheel of a vehicle; a second electric motor that drives a right wheel of the vehicle; a first oil pump that supplies oil to the first electric motor via a first oil supply passage; a second oil pump that supplies oil to the second electric motor via a second oil supply passage; a connecting channel that connects the first oil supply passage and the second oil supply passage; and a flow regulating device that is installed in the connecting channel and allows oil to flow in the connecting channel when one of the first oil pump and the second oil pump is abnormal.

4 Claims, 3 Drawing Sheets

CONTROL DEVICE
70
10
20
20a
20b
20c
30
31
32
32a
33
34
35
40
40a
40b
40c
50
51
52
52a
53
54
55
60
62
12
13
14
15
16
22
23
24
25
26
27
42
43
44
45
46
47
90
92
A
A
FR
RH

FIG. 3

DRIVE DEVICE THAT CAN EFFECTIVELY COOL TWO ELECTRIC MOTORS

CROSS-REFERENCE TO RELATED APPLICATION

This application claims priority to Japanese Patent Application No. 2023-089655 filed on May 31, 2023, incorporated herein by reference in its entirety.

BACKGROUND

1. Technical Field

The technique disclosed in the present specification relates to drive devices.

2. Description of Related Art

Japanese Unexamined Patent Application Publication No. 2008-283836 (JP 2008-283836 A) discloses a electrified vehicle in which a right wheel and a left wheel are driven by separate electric motors. The drive device of this electrified vehicle includes a first electric motor and a second electric motor. The driving force of the first electric motor is transmitted to the left wheel, and the driving force of the second electric motor is transmitted to the right wheel.

SUMMARY

Electrified vehicles are provided with an oil pump that supplies oil to an electric motor. The electric motor is cooled by oil supplied to the electric motor. In the drive device including the first electric motor and the second electric motor, a first oil pump configured to supply oil to the first electric motor and a second oil pump configured to supply oil to the second electric motor can be mounted independently of each other. With the first oil pump and the second oil pump, the flow rate of the oil supplied to the first electric motor and the flow rate of the oil supplied to the second electric motor can be individually controlled. Therefore, the temperature of the first electric motor and the temperature of the second electric motor can be appropriately controlled.

When an abnormality occurs in one of the first and second oil pumps in the drive device, it is difficult to cool the electric motor corresponding to the abnormal oil pump. The present specification proposes a technique that can cool two electric motors even when an abnormality occurs in one of two oil pumps.

A drive device disclosed in the present specification includes:

- a first electric motor configured to drive a left wheel of a vehicle;
- a second electric motor configured to drive a right wheel of the vehicle;
- a first oil pump configured to supply oil to the first electric motor via a first oil supply passage;
- a second oil pump configured to supply oil to the second electric motor via a second oil supply passage;
- a connecting channel connecting the first oil supply passage and the second oil supply passage; and
- a flow regulating device installed in the connecting channel and configured to allow oil to flow in the connecting channel when one of the first oil pump and the second oil pump is abnormal.

The flow regulating device may be any device as long as it allows oil to flow in the connecting channel when one of the first oil pump and the second oil pump is abnormal. For example, the flow regulating device may be a valve configured to open the connecting channel when one of the first oil pump and the second oil pump is abnormal. The flow regulating device may be a member having a high channel resistance. In this case, when one of the first oil pump and the second oil pump is abnormal, a pressure difference is generated on both sides of the flow regulating device, so that oil flows in the connecting channel.

In this drive device, the first oil supply passage and the second oil supply passage are connected by the connecting channel. When both the first oil pump and the second oil pump are operating normally, little oil flows in the connecting channel. Therefore, in this case, oil is supplied from the first oil pump to the first electric motor via the first oil supply passage, and oil is supplied from the second oil pump to the second electric motor via the second oil supply passage. When the first oil pump is abnormal, oil is allowed to flow in the connecting channel. Therefore, in this case, part of oil discharged from the second oil pump is supplied to the first electric motor via the second oil supply passage, the connecting channel, and the first oil supply passage. As a result, both the first electric motor and the second electric motor are cooled by the oil discharged from the second oil pump. When the second oil pump is abnormal, oil is allowed to flow in the connecting channel. Therefore, in this case, part of oil discharged from the first oil pump is supplied to the second electric motor via the first oil supply passage, the connecting channel, and the second oil supply passage. As a result, both the first electric motor and the second electric motor are cooled by the oil discharged from the first oil pump. As described above, in this drive device, the two electric motors are cooled even when an abnormality occurs in one of the two oil pumps.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a process that is performed by a control device 70.

DETAILED DESCRIPTION OF EMBODIMENTS

Additional features of the drive device disclosed in the present specification will be listed below.

A flow regulating device may be disposed in a middle of the connecting channel.

According to this configuration, it is possible to prevent the distribution of the resistance of the communication flow path from being unbalanced.

The drive device may further include a first gear set that transmits the driving force of the first electric motor to the left wheel, a second gear set that transmits the driving force of the second electric motor to the right wheel, and a gear housing chamber that houses the first gear set and the second gear set. The oil that has passed through the first electric motor may flow into the gear housing chamber, and the oil that has passed through the second electric motor may flow into the gear housing chamber. The chamber housing the first gear set and the chamber housing the second gear set may be connected to each other, or they may be separated by a partition wall.

According to this configuration, the gear can be lubricated by the oil that has passed through the electric motor.

The flow regulating device may be an orifice.

The flow regulating device may be a valve. The drive device may further include a valve control device configured to open the valve when one of the first oil pump and the second oil pump is abnormal.

The drive device may further include an oil pump control device configured to increase the output of the other of the first oil pump and the second oil pump when one of the first oil pump and the second oil pump is abnormal.

The drive device may further include an electric motor control device configured to reduce the output of the first electric motor and the output of the second electric motor when one of the first oil pump and the second oil pump is abnormal.

The motor control device may control the amount of decrease in output of the first electric motor and the amount of decrease in output of the second electric motor according to the temperature of the drive device.

The electric motor control device may reduce the output of the first electric motor and the output of the second electric motor at the same rate.

First Embodiment

Figure 1:
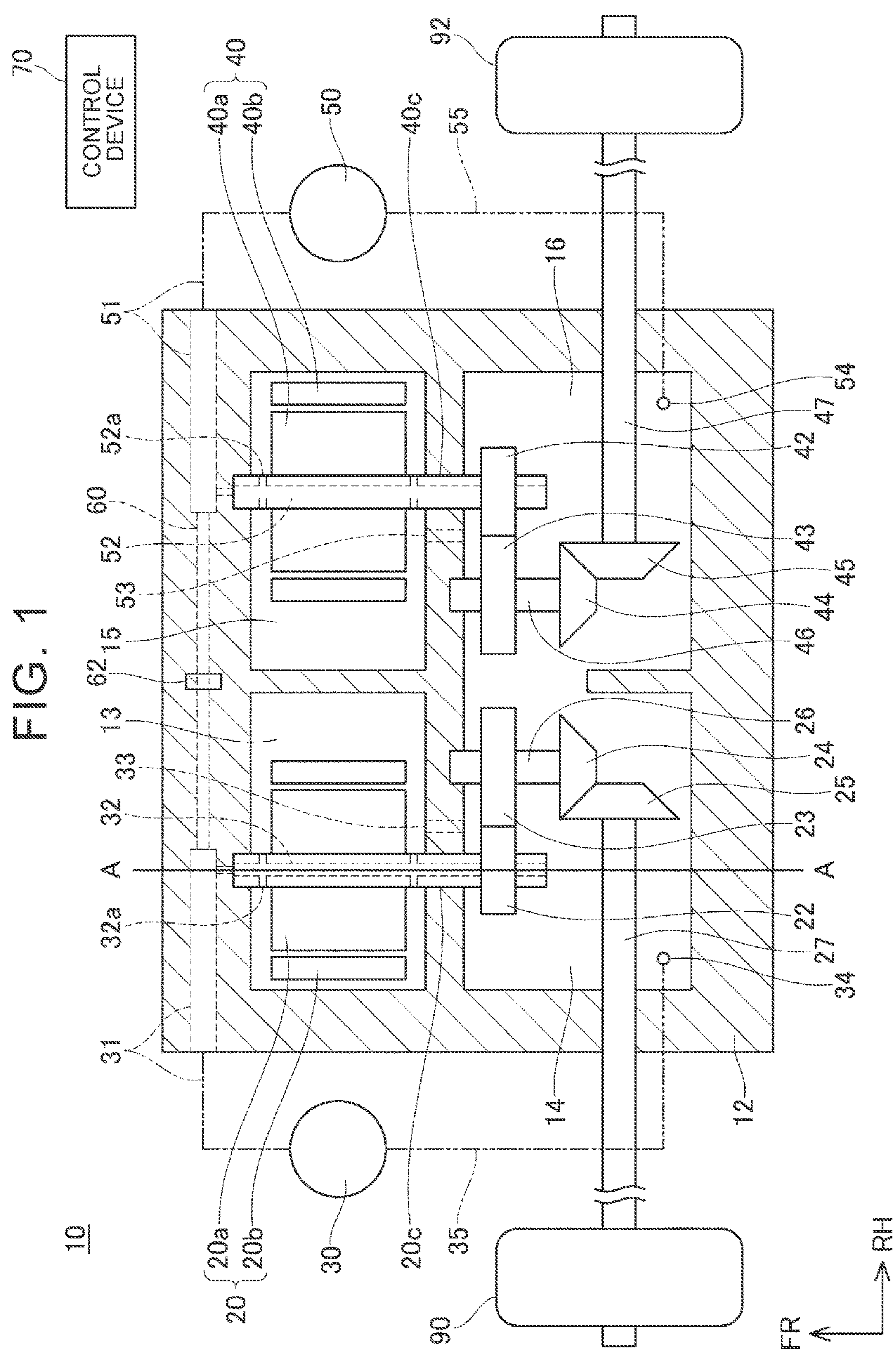
FIG. 1 is a sectional view of a drive device taken along the right-left direction.

The drive device 10 of the embodiment shown in FIG. 1 is mounted on a electrified vehicle. In FIG. 1, an arrow FR indicates a vehicle front direction, and an arrow RH indicates a vehicle right direction. The drive device 10 drives the left rear wheel 90 and the right rear wheel 92 of electrified vehicle.

The drive device 10 includes a case 12. Inside the case 12, a left electric motor chamber 13, a left gear chamber 14, a right electric motor chamber 15, and a right gear chamber 16 are provided. The left gear chamber 14 is disposed behind the left electric motor chamber 13. The right electric motor chamber 15 is disposed on the right side of the left electric motor chamber 13. The right gear chamber 16 is disposed behind the right electric motor chamber 15. In FIG. 1, the left gear chamber 14 and the right gear chamber 16 are connected to each other, but the left gear chamber 14 and the right gear chamber 16 may be separated by a partition wall. The left electric motor 20 is housed in the left electric motor chamber 13. A gear set that transmits the driving force of the left electric motor 20 to the left rear wheel 90 is housed in the left gear chamber 14. The right electric motor 40 is housed in the right electric motor chamber 15. A gear set that transmits the driving force of the right electric motor 40 to the right rear wheel 92 is housed in the right gear chamber 16.

The left electric motor 20 has a rotor 20*a* and a stator 20*b*. The rotor 20*a* has a shaft 20*c*. The rotor 20*a* is housed in the left electric motor chamber 13 in a direction in which the shaft 20*c* extends in the front-rear direction of the electrified vehicle. The rotor 20*a* is rotatably supported by a bearing (not shown) provided in the case 12. The shaft 20*c* passes through a partition wall between the left electric motor chamber 13 and the left gear chamber 14, and extends from the left electric motor chamber 13 to the left gear chamber 14. The stator 20*b* is disposed around the rotor 20*a*. When a current flows through the stator 20*b*, the rotor 20*a* rotates.

The gear set provided in the left gear chamber 14 has gears 22, 23, 24, 25. A counter shaft 26 and a drive shaft 27 are disposed in the left gear chamber 14. The counter shaft 26 is arranged parallel to the shaft 20*c* of the rotor 20*a*. The counter shaft 26 is rotatably indicated by a bearing (not shown) provided in the case 12. The drive shaft 27 extends along the left-right direction of electrified vehicle. The drive shaft 27 extends from the left gear chamber 14 through the left side wall of the case 12 to the outside of the case 12. A left rear wheel 90 is connected to a left end portion of the drive shaft 27. The drive shaft 27 is rotatably indicated by a bearing (not shown) provided in the case 12. The gears 22 are cylindrical gears and are fixed to the shaft 20*c* of the rotor 20*a*. The gear 23 is a cylindrical gear and is fixed to the counter shaft 26. The gear 23 is engaged with the gear 22. The gear 24 is a truncated conical gear and is fixed to the counter shaft 26. The gear 25 is a truncated conical gear and is fixed to the drive shaft 27. The gear 25 is engaged with the gear 24. The gear 24 and the gear 25 constitute a hypoid gear.

When the left electric motor 20 is driven to rotate the shaft 20*c* of the rotor 20*a*, the gear 22 rotates, and a driving force is transmitted from the gear 22 to the gear 23. Therefore, the gear 23, the counter shaft 26, and the gear 24 rotate. When the gear 24 rotates, a driving force is transmitted from the gear 24 to the gear 25. Therefore, the gear 25 and the drive shaft 27 rotate. As a result, the left rear wheel 90 rotates. As described above, the gear set in the left gear chamber 14 transmits the driving force of the left electric motor 20 to the left rear wheel 90.

Figure 2:
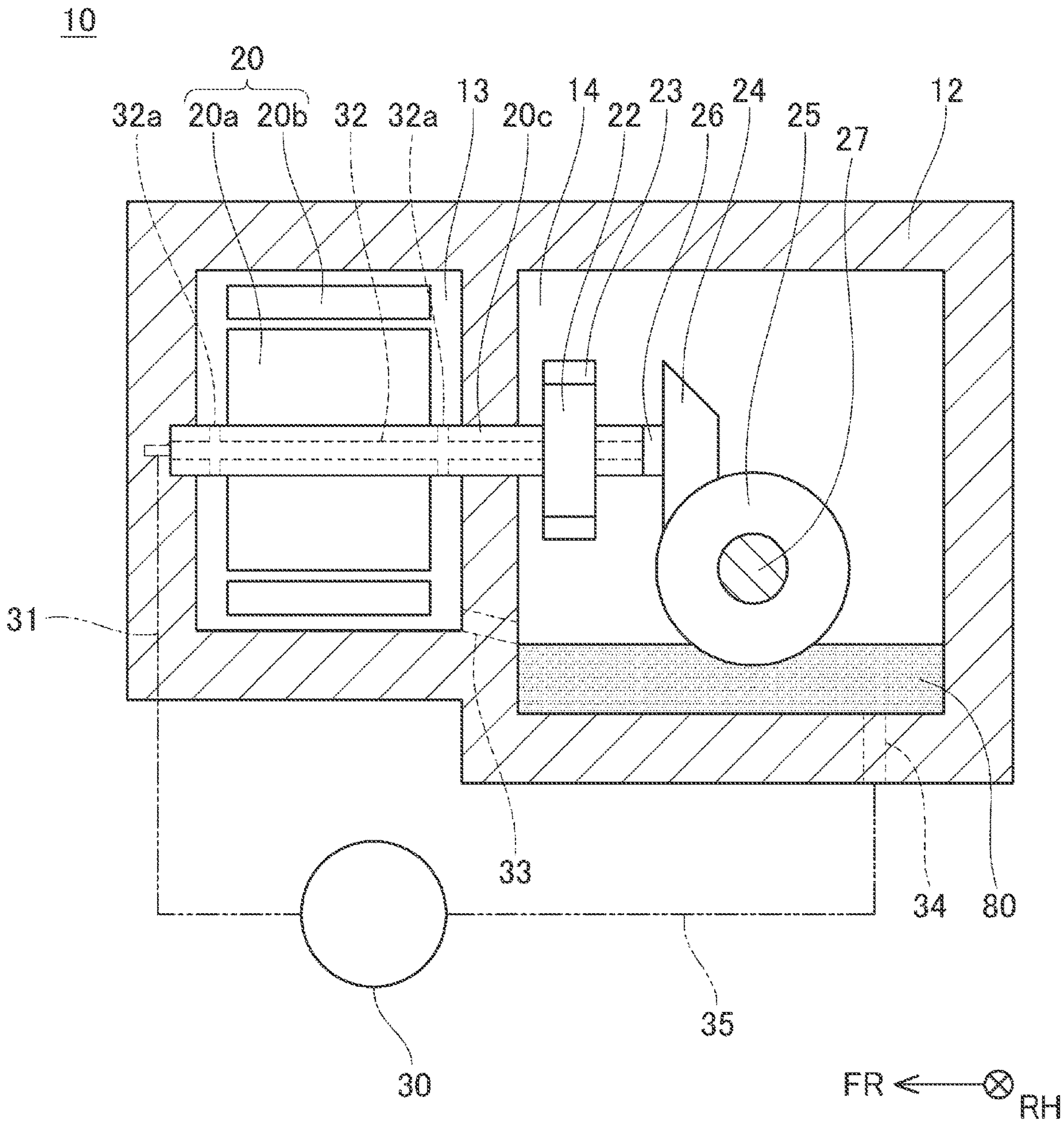
FIG. 2 is a sectional view of the drive device taken along A-A in FIG. 1.

As shown in FIG. 2, the bottom surface of the left gear chamber 14 is disposed below the bottom surface of the left electric motor chamber 13. Oil 80 is stored in the left gear chamber 14 at a water level at which the lower portion of the gear 25 is immersed. Therefore, when the gear 25 is rotated by the driving of the left electric motor 20, the oil 80 stored in the left gear chamber 14 is flipped up by the gear 25. As a result, oil is sprayed into the left gear chamber 14. Each gear is lubricated by oil sprayed into the left gear chamber 14.

The drive device 10 has a left oil circulation path for circulating oil to the left electric motor chamber 13 and the left gear chamber 14. The left oil circulation path includes an oil pump 30, an oil supply passage 31, a shaft flow path 32, an oil flow path 33, an oil discharge port 34, and an oil discharge passage 35. The oil supply passage 31 is constituted by a pipe outside the case 12 and a flow path provided inside the outer wall of the case 12. The shaft 20*c* of the rotor 20*a* has a cylindrical shape, and the shaft flow path 32 is constituted by a central hole thereof. The shaft flow path 32 extends from the front end to the rear end of the shaft 20*c*. The oil supply passage 31 connects the discharge port of the oil pump 30 and the front end of the shaft flow path 32. A plurality of oil spraying flow paths 32*a* are provided on the outer peripheral wall of the shaft 20*c*. The oil flow path 33 passes through a partition wall between the left electric motor chamber 13 and the left gear chamber 14. The oil discharge port 34 opens to the bottom surface of the left gear chamber 14. The oil discharge passage 35 is constituted by a pipe outside the case 12. The oil discharge passage 35 connects the oil discharge port 34 and the suction port of the oil pump 30.

When the oil pump 30 operates, the oil 80 stored in the left gear chamber 14 is sucked into the oil discharge port 34. The oil sucked into the oil discharge port 34 is supplied to the shaft flow path 32 through the oil discharge passage 35, the oil pump 30, and the oil supply passage 31. In the shaft flow path 32, oil flows from the front end to the rear end of the shaft flow path 32. The oil flowing through the shaft flow path 32 to the rear end is discharged into the left gear chamber 14. In addition, a part of the oil flowing in the shaft flow path 32 is sprayed from the oil spraying flow path 32*a* into the left electric motor chamber 13. The left electric motor 20 is cooled by the oil flowing in the shaft flow path 32 and the oil sprayed into the left electric motor chamber 13. Further, the rotor 20*a* is lubricated by the oil sprayed into the left electric motor chamber 13. The oil sprayed into the left electric motor chamber 13 flows through the oil flow path 33 to the left gear chamber 14. As described above, the operation of the oil pump 30 causes the oil to circulate in the left oil circulation path, and the left electric motor 20 is cooled.

The structures in the right electric motor chamber 15 and the right gear chamber 16 are the same as the structures obtained by reversing the structures in the left electric motor chamber 13 and the left gear chamber 14. The right electric motor 40 has a rotor 40*a* and a stator 40*b*. The rotor 40*a* has a shaft 40*c*. The rotor 40*a* is housed in the right electric motor chamber 15 in a direction in which the shaft 40*c* extends along the front-rear direction of electrified vehicle. The rotor 40*a* is rotatably supported by a bearing (not shown) provided in the case 12. The shaft 40*c* passes through a partition wall between the right electric motor chamber 15 and the right gear chamber 16, and extends from the right electric motor chamber 15 to the right gear chamber 16. The stator 40*b* is disposed around the rotor 40*a*. When a current flows through the stator 40*b*, the rotor 40*a* rotates.

The gear set provided in the right gear chamber 16 includes gears 42, 43, 44, and 45. A counter shaft 46 and a drive shaft 47 are disposed in the right gear chamber 16. The counter shaft 46 is arranged parallel to the shaft 40*c* of the rotor 40*a*. The counter shaft 46 is rotatably indicated by a bearing (not shown) provided in the case 12. The drive shaft 47 extends along the left-right direction of electrified vehicle. The drive shaft 47 extends from the right gear chamber 16 through the right side wall of the case 12 to the outside of the case 12. A right rear wheel 92 is connected to the right end of the drive shaft 47. The drive shaft 47 is rotatably indicated by a bearing (not shown) provided in the case 12. The gears 42 are cylindrical gears and are fixed to the shaft 40*c* of the rotor 40*a*. The gear 43 is a cylindrical gear and is fixed to the counter shaft 46. The gear 43 is engaged with the gear 42. The gear 44 is a conical gear and is fixed to the counter shaft 46. The gear 45 is a conical gear and is fixed to the drive shaft 47. The gear 45 is engaged with the gear 44. The gear 44 and the gear 45 constitute a hypoid gear.

When the shaft 40*c* rotates due to the driving of the right electric motor 40, the driving force is transmitted from the shaft 40*c* to the drive shaft 47 via the gears 42, 43, 44, and 45. As a result, the drive shaft 47 rotates, and the right rear wheel 92 rotates. As described above, the gear set in the right gear chamber 16 transmits the driving force of the right electric motor 40 to the right rear wheel 92.

As in FIG. 2, the bottom surface of the right gear chamber 16 is disposed below the bottom surface of the right electric motor chamber 15. Oil is stored in the right gear chamber 16 at a water level at which the lower portion of the gear 45 is immersed. Therefore, when the gear 45 is rotated by the driving of the right electric motor 40, the oil stored in the right gear chamber 16 is flipped up by the gear 45. As a result, oil is sprayed into the right gear chamber 16. The respective gears are lubricated by oil sprayed into the right gear chamber 16.

The drive device 10 has a right oil circulation path for circulating oil in the right electric motor chamber 15 and the right gear chamber 16. The right oil circulation path includes an oil pump 50, an oil supply passage 51, a shaft flow path 52, an oil flow path 53, an oil discharge port 54, and an oil discharge passage 55. The oil supply passage 51 is constituted by a pipe outside the case 12 and a flow passage provided inside the outer wall of the case 12. The shaft 40*c* of the rotor 40*a* has a cylindrical shape, and the shaft flow path 52 is constituted by a central hole thereof. The shaft flow path 52 extends from the front end to the rear end of the shaft 40*c*. The oil supply passage 51 connects the discharge port of the oil pump 50 and the front end of the shaft flow path 52. A plurality of oil spraying flow paths 52*a* are provided on the outer peripheral wall of the shaft 40*c*. The oil flow path 53 passes through a partition wall between the right electric motor chamber 15 and the right gear chamber 16. The oil discharge port 54 opens to the bottom surface of the right gear chamber 16. The oil discharge passage 55 is constituted by a pipe outside the case 12. The oil discharge passage 55 connects the oil discharge port 54 and the suction port of the oil pump 50.

When the oil pump 50 operates, the oil stored in the right gear chamber 16 is supplied to the shaft flow path 52 through the oil discharge port 54, the oil discharge passage 55, the oil pump 50, and the oil supply passage 51. The oil flowing from the front end to the rear end in the shaft flow path 52 is discharged into the right gear chamber 16. In addition, a part of the oil flowing in the shaft flow path 52 is sprayed from the oil spraying flow path 52*a* into the right electric motor chamber 15. The right electric motor 40 is cooled by the oil flowing in the shaft flow path 52 and the oil sprayed into the right electric motor chamber 15. Further, the rotor 40*a* is lubricated by the oil sprayed into the right electric motor chamber 15. The oil sprayed into the right electric motor chamber 15 flows through the oil flow path 53 to the right gear chamber 16. As described above, the operation of the oil pump 50 circulates oil in the right oil circulation path, and the right electric motor 40 is cooled.

A connecting channel 60 for connecting the oil supply passage 31 and the oil supply passage 51 is provided inside the outer wall of the case 12. A flow regulating device 62 is installed in the middle of the connecting channel 60. In Example 1, the flow regulating device 62 is an orifice. Therefore, the flow path resistance of the connecting channel 60 is larger than the flow path resistance of the oil supply passage 31 and the flow path resistance of the oil supply passage 51.

Figure 3:
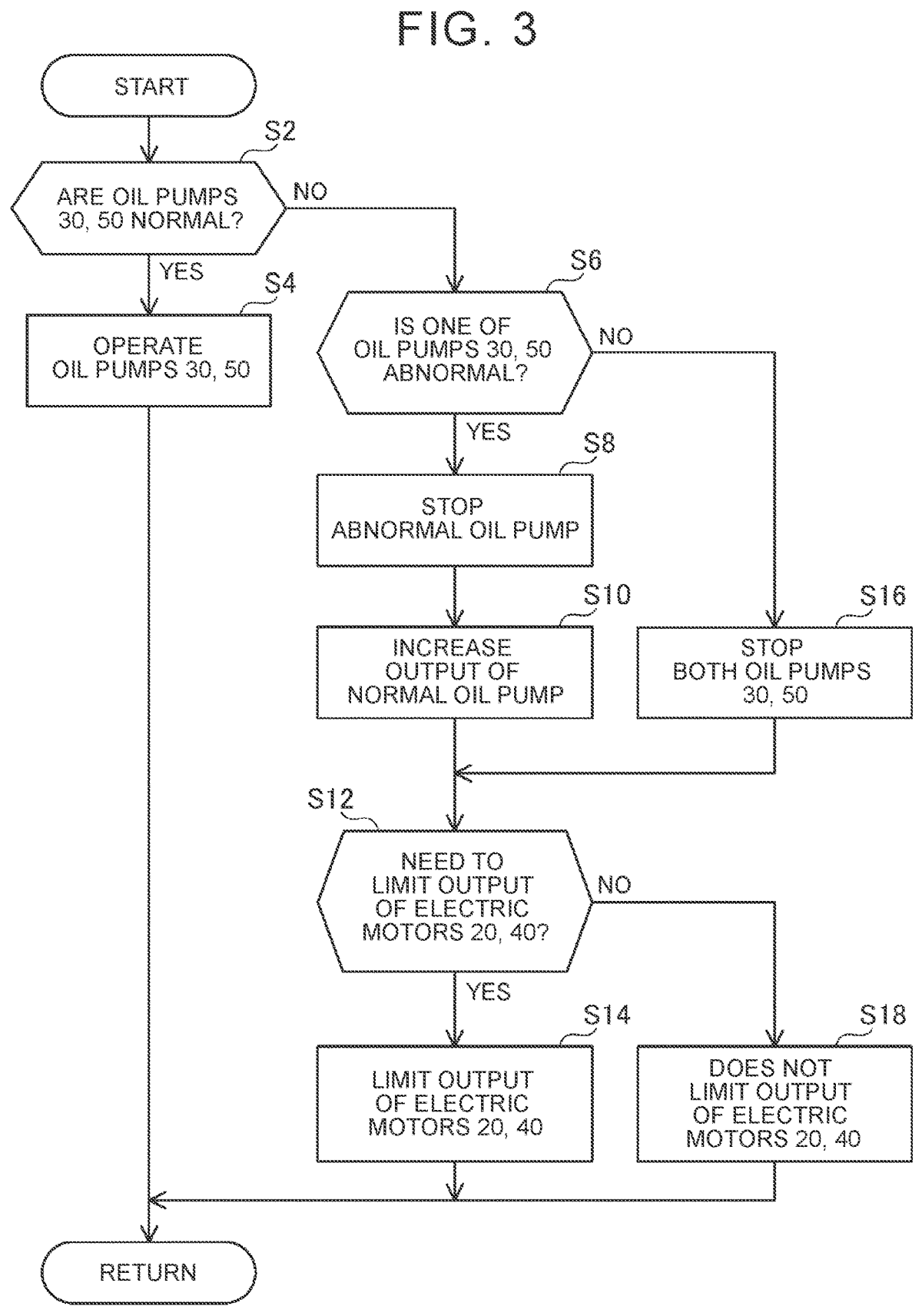

The drive device 10 includes a control device 70 that controls the oil pumps 30 and 50. FIG. 3 shows a process executed by the control device 70. The control device 70 repeatedly executes the process of FIG. 3 while electrified vehicle is running.

In S2 (operation when the oil pumps 30 and 50 are normal), the control device 70 determines whether both of the oil pumps 30 and 50 are normal. When both of the oil pumps 30, 50 are normal, the control device 70 operates the oil pumps 30, 50 in S4. While both of the oil pumps 30 and 50 are normal, S2, S4 is repeatedly executed, and the oil pumps 30 and 50 continue to operate. In a state in which the oil pumps 30 and 50 are operating normally, both the pressure in the oil supply passage 31 and the pressure in the oil supply passage 51 are high, and a high pressure difference does not occur between the oil supply passage 31 and the oil supply passage 51. Therefore, almost no oil flows in the connecting channel 60 having a high flow path resistance. Therefore, the oil discharged from the oil pump 30 is supplied to the left electric motor 20, and the oil discharged from the oil pump 50 is supplied to the right electric motor

40. Therefore, the left electric motor 20 and the right electric motor 40 are appropriately cooled. In this case, the control device 70 independently controls the outputs of the oil pumps 30 and 50. That is, the output of the oil pump 30 is controlled according to the state of the left electric motor 20, and the output of the oil pump 50 is controlled according to the state of the right electric motor 40. As described above, since the control device 70 independently controls the output of the oil pump 30 and the output of the oil pump 50, the temperatures of the left electric motor 20 and the right electric motor 40 are appropriately controlled.

(Operation when one of the oil pumps 30, 50 is abnormal) When an abnormality occurs in the oil pumps 30, 50 while the electrified vehicle is traveling, the control device 70 determines NO in S2. Then, the control device 70 determines whether only one of the oil pumps 30, 50 is abnormal or both of the oil pumps 30 and 50 are abnormal in S6. When only one of the oil pumps 30, 50 is abnormal, the control device 70 stops the oil pump in which an abnormality has occurred in S8.

When the oil pump 30 is stopped due to an abnormality, the pressure in the oil supply passage 31 decreases. As a result, the pressure in the oil supply passage 51 becomes higher than the pressure in the oil supply passage 31, and a part of the oil in the oil supply passage 51 flows to the oil supply passage 51 through the connecting channel 60. The oil flowing to the oil supply passage 51 through the connecting channel 60 flows to the shaft flow path 32 of the left electric motor 20. As a result, the left electric motor 20 is cooled. In this way, when an abnormality occurs in the oil pump 30, the oil discharged from the oil pump 50 is supplied to the left electric motor 20 and the right electric motor 40, and the temperature rise of the left electric motor 20 and the right electric motor 40 is suppressed. When the oil pump 50 is stopped due to an abnormality, part of the oil discharged from the oil pump 30 is supplied to the right electric motor 40 through the connecting channel 60. That is, when an abnormality occurs in the oil pump 50, the oil discharged from the oil pump 30 is supplied to the left electric motor 20 and the right electric motor 40, so that an increase in temperature of the left electric motor 20 and the right electric motor 40 is reduced. In this way, even when an abnormality occurs in one of the oil pumps 30, 50, the left electric motor 20 and the right electric motor 40 are cooled.

The flow regulating device 62 (that is, the orifice) is disposed in the middle of the connecting channel 60. Therefore, the flow path resistance of the connecting channel 60 is substantially equal between the case where the oil flows in the connecting channel 60 toward the oil supply passage 51 and the case where the oil flows in the opposite direction. Therefore, the electric motors 20 and 40 can be suitably cooled even when either of the oil pumps 30 and 50 is stopped.

Next, in S10, the control device 70 increases the power of the normal oil pump. This compensates for the reduced cooling performance caused by the stoppage of one of the oil pumps. Next, the control device 70 determines whether or not the left electric motor 20 and the right electric motor 40 need to be output-limited in S12. When the output command for the left electric motor 20 and the right electric motor 40 is too large with respect to the cooling performance of the oil pump, the control device 70 determines YES in S12. When S12 is YES, the control device 70 limits the power of the left electric motor 20 and the power of the right electric motor 40 by S14. This prevents the left electric motor 20 and the right electric motor 40 from overheating. In S14, the control device 70 decreases the output of the left electric motor 20 and the output of the right electric motor 40 at the same rate. As a result, the output of the left electric motor 20 and the output of the right electric motor 40 become unbalanced, and the traveling direction of electrified vehicle is prevented from changing. In addition, in S14, the control device 70 may control the output decrease amount of the left electric motor 20 and the output decrease amount of the right electric motor 40 according to the temperature of the drive device 10 (for example, the internal temperature of the drive device 10 and the temperature of the circulating oil). Thus, the output reduction amount of the left electric motor 20 and the right electric motor 40 can be minimized. When S12 is NO (that is, when the output limits of the left electric motor 20 and the right electric motor 40 are not required), the control device 70 controls the left electric motor 20 and the right electric motor 40 with the normal output at S18.

(Operation when both of the oil pumps 30, 50 are abnormal) When both of the oil pumps 30, 50 are abnormal, the control device 70 determines NO in S6 and stops both of the oil pumps 30, 50 in S16. Thereafter, the control device 70 controls the left electric motor 20 and the right electric motor 40 in S12, S14, S18.

As described above, in the drive device 10 of the first embodiment, when an abnormality occurs in one of the oil pumps 30, 50, the oil discharged from the normal oil pump can be supplied to both the left electric motor 20 and the right electric motor 40. As a result, the left electric motor 20 and the right electric motor 40 can be cooled.

Second Embodiment

In the second embodiment, the flow regulating device 62 is constituted by an on-off valve that opens and closes the connecting channel. The flow regulating device 62 is controlled by a control device 70. In the second embodiment, when both of the oil pumps 30 and 50 are normal, the control device 70 controls the flow regulating device 62 to the closed state. In this case, the oil discharged from the oil pump 30 is supplied to the left electric motor 20, and the oil supplied from the oil pump 50 is supplied to the right electric motor 40. When one of the oil pumps 30, 50 is abnormal, the control device 70 controls the flow regulating device 62 to be in the open state. As a result, oil flows through the connecting channel 60. Therefore, the oil discharged by the normal oil pump is supplied to both the left electric motor 20 and the right electric motor 40, and both the left electric motor 20 and the right electric motor 40 are cooled. As described above, even when an abnormality occurs in one of the two oil pumps 30, 50, the left electric motor 20 and the right electric motor 40 can be cooled.

In the first and second embodiments, the gear chambers 14, 16 function as oil storage chambers for storing the oil supplied to the oil pumps 30, 50. However, an oil storage chamber may be provided separately from the gear chambers 14, 16.

In Examples 1 and 2 described above, the electric motor was cooled by the oil discharged by the oil pump flowing inside the shaft of the rotor. However, if the electric motor can be cooled, the oil may be supplied from the oil pump to the electric motor in any form. For example, oil may be discharged from the oil supply passage toward the outer peripheral surface of the rotor.

Although the embodiments have been described in detail above, the embodiments are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or the drawings achieve a plurality of objectives at the same time, and achieving one of the objectives itself has technical usefulness.

What is claimed is:

1. A drive device, comprising:

a first electric motor configured to drive a left wheel of a vehicle;

a second electric motor configured to drive a right wheel of the vehicle;

a first oil pump configured to supply oil to the first electric motor via a first oil supply passage;

a second oil pump configured to supply oil to the second electric motor via a second oil supply passage;

a connecting channel connecting the first oil supply passage and the second oil supply passage;

a flow regulating device installed in the connecting channel and configured to allow oil to flow in the connecting channel when one of the first oil pump and the second oil pump is abnormal;

a first gear set configured to transmit a driving force of the first electric motor to the left wheel;

a second gear set configured to transmit a driving force of the second electric motor to the right wheel; and a gear housing chamber that houses the first gear set and the second gear set, wherein the oil that has passed through the first electric motor flows into the gear housing chamber, and the oil that has passed through the second electric motor flows into the gear housing chamber.

2. The drive device according to claim 1, wherein the flow regulating device is disposed in a middle of the connecting channel.

3. The drive device according to claim 1, wherein the flow regulating device is an orifice.

4. The drive device according to claim 1, wherein the flow regulating device is a valve, the drive device further comprising a valve control device configured to open the valve when the one of the first oil pump and the second oil pump is abnormal.

* * * * *